United States Patent
Haymann

[11] Patent Number: 5,365,046
[45] Date of Patent: Nov. 15, 1994

[54] PREVENTING UNAUTHORIZED USE OF A CREDIT CARD

[76] Inventor: Frank V. Haymann, 25 Grenville Ave., Savoy, Johannesburg, Transvaal, South Africa

[21] Appl. No.: 31,341
[22] Filed: Mar. 15, 1993
[51] Int. Cl.⁵ ............................................. G06K 5/00
[52] U.S. Cl. ................................... 235/380; 235/379
[58] Field of Search .............................. 235/379, 380

[56] References Cited

U.S. PATENT DOCUMENTS

| | | |
|---|---|---|
| 3,641,315 | 2/1972 | Tateisi . |
| 3,655,947 | 4/1972 | Tateisi . |
| 3,786,420 | 1/1974 | Stambler ............................. 340/149 |
| 4,016,405 | 4/1977 | McCune et al. .................... 235/61.7 |
| 4,023,012 | 5/1977 | Ano et al. ........................... 235/61.7 |
| 4,214,230 | 7/1980 | Fak et al. . |
| 4,636,951 | 1/1987 | Harlick ................................ 235/380 |

FOREIGN PATENT DOCUMENTS

| | | |
|---|---|---|
| 0212615 | of 0000 | European Pat. Off. ........ G07F 7/10 |
| 0397512A3 | 11/1990 | European Pat. Off. ........ G07F 7/10 |
| 0397512A2 | 11/1990 | European Pat. Off. ........ G07F 7/10 |

OTHER PUBLICATIONS

Abstract of EP 0143096, Telefon L. M. Ericson from European Patents Report, p. 114, Week 8522.
Abstract of EP 0174916, Casio Computer for Identification Card and Authentication System Therefor, Shigeyuki Kawana, published Mar. 12, 1986.
Abstract of EP 0177325, Rigby Electronic Group from European Patents Report, p. 149, Week 8615.
Abstract of EP 0208455, Light Signatures from European Patents Report, p. 101, Week 8702.
Abstract of EP 0234954, Instellicard Int., Inc. from European Patents Report, p. 209, Week 8735.
Abstract of DE 2528668, Omron Tateisi Electronics from Computing and Control, p. 2.
Abstract of WO 8501139, NCR Corporation, published Mar. 14, 1985 for A System Having Controlled Access Thereto and a Method of Operating Such a System.
Abstract of WO 9103801, Martin Reef, published Mar. 21, 1991 for Fraud Detection in Credit Cards.

*Primary Examiner*—Harold Pitts
*Attorney, Agent, or Firm*—Morgan & Finnegan

[57] ABSTRACT

A method of validating a credit card includes the steps of issuing a credit card to a holder, the card having an account number on it. The holder is issued with a personal identification number (PIN). Before a transaction involving the credit card can be authorized, a validation transaction must be carried out in which the credit card is inserted into an electronic terminal and the PIN code is entered. The PIN code and the account number are compared with information stored in a database, and only if the PIN code corresponds correctly to the account number is use of the credit card authorized. The method prevents credit cards being used for transactions involving amounts greater than an unauthorized transaction limit applying to the card in question.

18 Claims, 2 Drawing Sheets

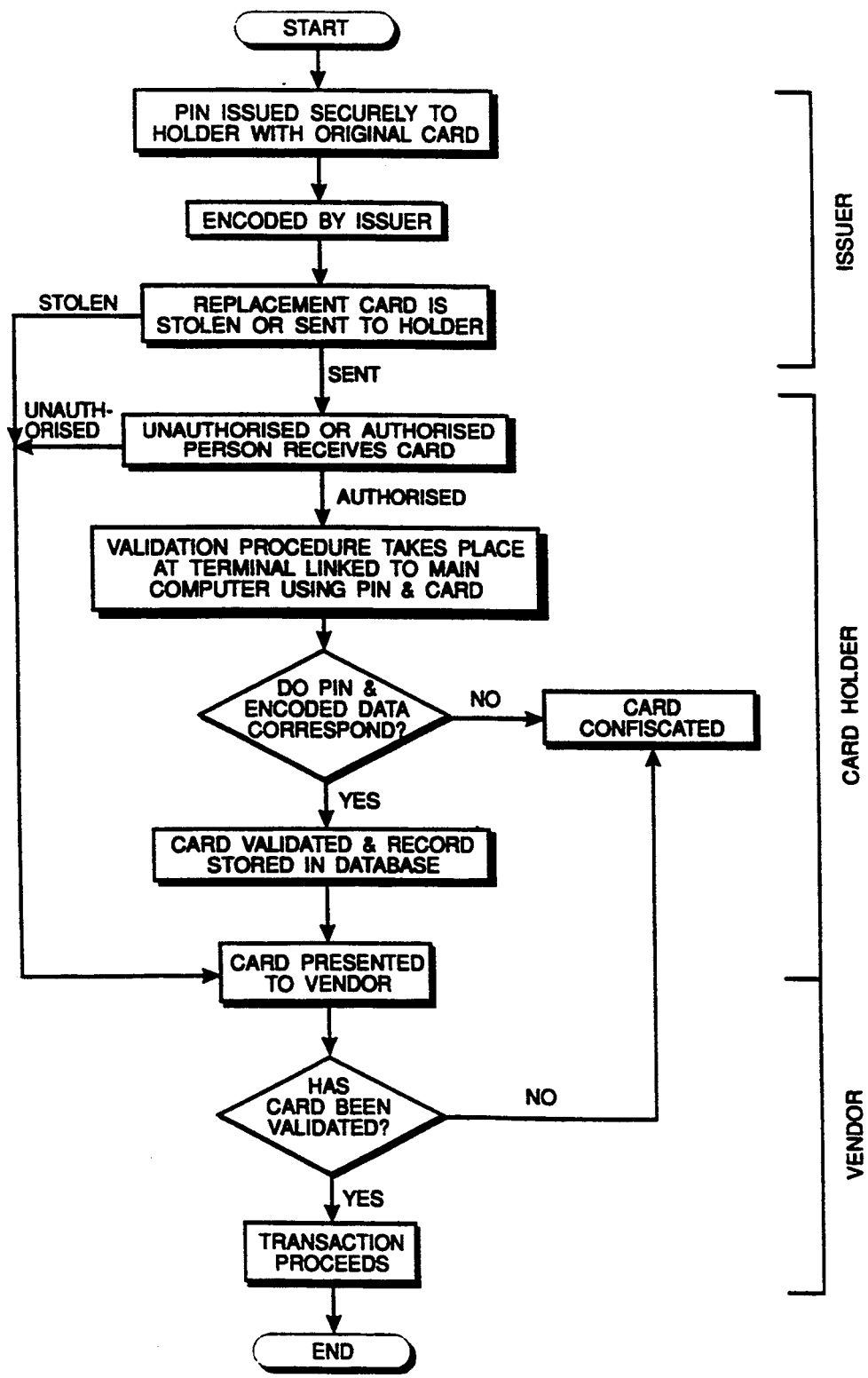

PREVENTING UNAUTHORIZED USE OF A CREDIT CARD

BACKGROUND OF THE INVENTION

This invention relates to a method of validating a credit card.

Credit cards are commonly sent through the post to their intended recipients. On receipt of the credit card, the holder signs the card and can then use it to conduct transactions. If the card is intercepted, in the post or otherwise, a third party can sign the card, and can then proceed to use the card fraudulently. Even in the case of large transactions where an authorisation must be obtained from the financial institution issuing the card, an unauthorized party may be able to use the credit card for some time, typically weeks or even months before it is realised that the credit card has been intercepted and it is recorded on a list of "hot" cards.

Furthermore, well made counterfeit cards are appearing in increasing numbers. If these are properly encoded, a vendor will not be able to distinguish genuine and counterfeit cards.

As a result of the above two problems, credit card issuing houses and banks are being defrauded of vast sums of money.

SUMMARY OF THE INVENTION

According to the invention a method of validating a credit card comprises the steps of:
  issuing a credit card to a holder, the credit card bearing a first identification code;
  assigning a second identification code to the holder;
  conducting a validation transaction utilising the credit card wherein the first and second identification codes are input to a terminal;
  determining whether the first and second identification codes both correspond to the same holder;
  generating a validation record confirming the validity of the card if the first and second identification codes correspond; and
  storing the validation record in a database which can be accessed by a vendor, so that use of the credit card may be authorised by reference to the validation record.

The first identification code may be encoded on a magnetic stripe on the credit card.

In addition to the first identification code, further information such as the period of validity of the card may be encoded on the magnetic stripe.

The second identification code may be a personal identity number (PIN) assigned to the holder.

The transaction is preferably conducted on a terminal such as an automatic teller machine (ATM) which reads the first identification code and any further information from the magnetic stripe on the credit card, allows the holder to input the second identification code manually, and transmits the codes to a central data processing station for verification.

A printed record of the transaction may be generated, and may be retained by the terminal for record purposes, or may be issued to the holder for use with the credit card.

Instead of an ATM, the terminal may be a point-of-sale (POS) device, a computer with a modem, or even a telephone. In the latter case, the codes can be transmitted verbally or by using the dialler or keypad of the telephone.

BRIEF DESCRIPTION OF THE DRAWINGS

FIG. 2 is a simplified flow chart illustrating the method.

DESCRIPTION OF EMBODIMENTS

Figure 1:
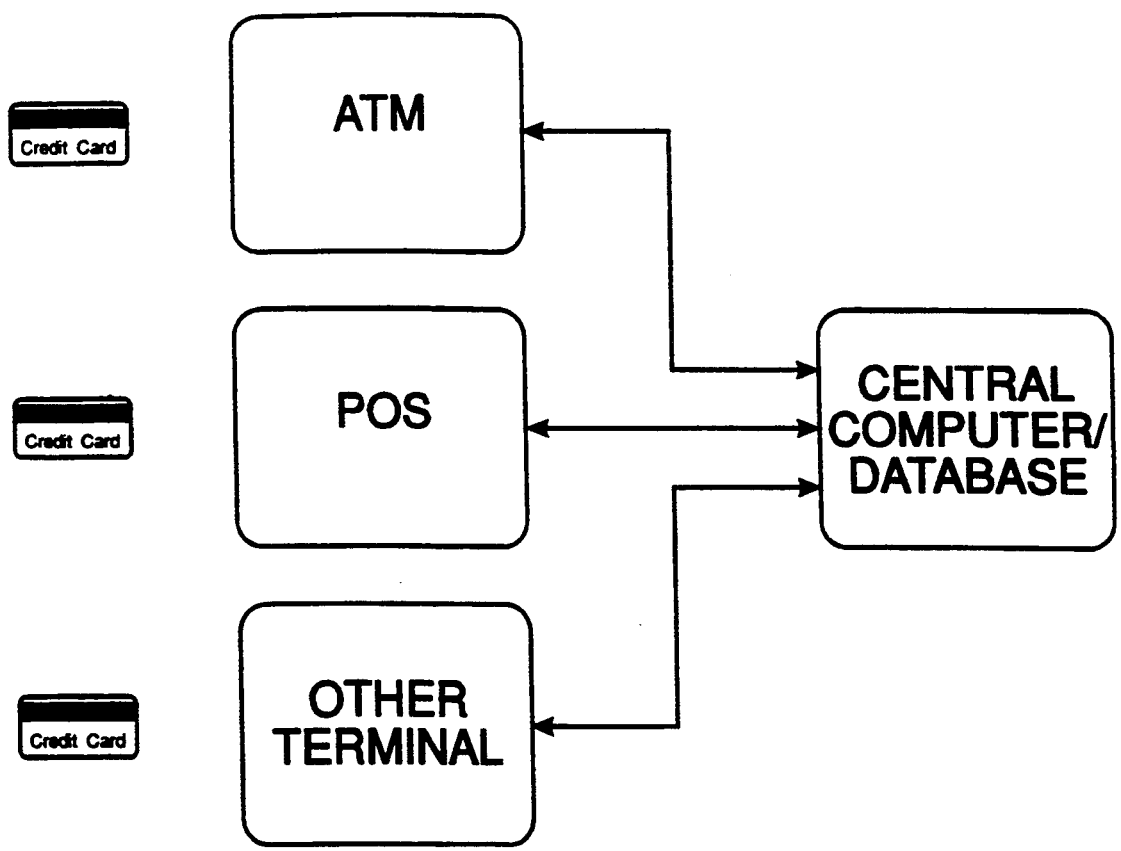
FIG. 1 is a simplified block diagram showing apparatus for conducting the method of the invention.

A conventional credit card is typically a planar rectangular piece of plastics material on which are embossed a unique identification number, the name of the card holder and the expiry date of the card. Other information may also appear. The credit card usually has a magnetic stripe on its back, on which the credit card number is recorded. Other relevant information, such as the period of validity of the card, can also be recorded on the magnetic stripe.

In order to use credit cards (or other cards) for withdrawal of funds from the account of a holder, a personal identity number (PIN) is issued which is known only to the card holder. When the card is used in an automatic teller machine (ATM) for a cash withdrawal or a similar transaction, the card is first inserted into the terminal, which reads the card number, validity dates and/or related information on the magnetic stripe. The terminal then allows the card holder to input the PIN code manually. A verification procedure is then carried out to ensure that the card number and the PIN code both correspond to the same holder. The verification procedure may require the card number and the PIN code to be transmitted to a central database for verification, or the data may be stored at the terminal itself. In any event, if the verification procedure is not carried out satisfactorily, the transaction is aborted. Repeated unsuccessful transactions usually result in the card being confiscated by the machine.

In contrast to the above procedure, no PIN code is required to use the credit card in a normal credit transaction. As long as the signature on the back of the card corresponds to the signature on the credit card slip provided by a vendor, and the card is not listed as a stolen or lost card, the transaction is approved. In the case of transactions involving relatively large sums (typically greater than R200,00) the vendor may contact the credit card issuer for an "authorisation", to confirm that the card holder's account has sufficient credit for the transaction. However, if the card has been intercepted in the post, the issuer and the intended recipient may be completely unaware of the theft of the card, and it may be some weeks or months before the credit card issuer is informed of the fact that the card is missing and it is placed on the "hot" list. Similarly, it might be some weeks before the issuer and the card holder realise that a counterfeit copy of a card is being used.

To prevent this, the invention proposes that the credit card issuer require a validation transaction to be carried out using a newly issued credit card and the PIN code of the intended card holder before the credit card is considered to be valid or "authorised". The card and PIN code can be sent to the intended holder in the usual way, by post, or can be collected personally. Particularly when a new credit card is issued, and when a PIN code is assigned to the card holder, it is preferable that the card holder collect at least one of the card and the PIN code personally, showing suitable identification.

However, once a PIN code has been assigned to the card holder, the method of the invention reduces the need for replacement cards to be collected personally, or posted by registered mail.

To validate the credit card, the card holder may use the new card for a cash withdrawal or deposit, or may simply conduct a nominal transaction, such as a "deposit" or "withdrawal" of zero value, or another validation transaction specified by the credit card issuer, at an ATM or other terminal linked to a host computer and database at the financial institution in question. Instead, the terminal can have its own internal computer and database. The validation transaction can also be carried out at the same time as a conventional sales transaction is carried out, for example, via a point of sale (POS) terminal. Only once this has been done, and the terminal at which the transaction is conducted and/or the host computer of the card issuer has verified that the card number, validity dates and the PIN code correspond to the database records, is a validation record generated which effectively places the card on a list of valid cards, so that transactions greater than any maximum unauthorized limit can be authorised. The validation record is held in a database, at the financial institution concerned or elsewhere, which can be accessed by vendors to whom a card is presented during a transaction. In the event that the card presented to the vendor has not been successfully validated, it can be confiscated, or an alarm can be generated. However, if the card has been validated, the vendor will be informed accordingly and the transaction is authorised.

The flow chart of FIG. 2 illustrates the basic steps carried out by the card issuer, the card holder and a vendor to whom the card is presented. If the card issued by the financial institution is received by the intended recipient, he or she then carries out the above described validation procedure at an ATM or other terminal. Assuming that the card holder enters the correct PIN code during the validation transaction, the credit card will be validated, and a record to that effect will be stored in a database. If the card holder enters an incorrect PIN code more than a predetermined number of times (typically three times), the terminal confiscates the card.

As proof that the validation procedure has been conducted, the card holder signs a deposit slip or other record generated by the ATM, which is then deposited in the ATM or retained by the card holder.

If the credit card is intercepted by an unauthorised person, that person may try to carry out the validation procedure. However, without the PIN code corresponding to the card, there is little chance of the validation transaction being successful. If the unauthorised card holder simply presents the card to a vendor, the card may be used successfully only for transactions which fall below the maximum level permitted for unauthorised transactions. This level can be adjusted from time to time by the card issuer. If an attempt is made to use the card for a transaction involving an amount greater than the maximum unauthorised level, the vendor will be alerted to the fact that the card is unauthorised, as described above.

In order to protect credit card holders and credit card issuers during the period in which newly issued cards are most likely to be fraudulently used, that is, in the first few months after being issued, the credit card issuer can set a reduced unauthorised credit limit during, say, the first three months of the card's life. For example, during the first three months of the card's life a credit limit of R25,00 or R50,00 can be set, so that transactions involving amounts greater than this limit must be authorised. This will have the effect of reducing the total amount involved in fraudulent transactions, and will result in a large number of fraudulently used cards being removed from circulation.

Alternatively to the record being deposited in the ATM, it can be issued to the card holder conducting the transaction. It can then be required, during the period referred to above, or for the life of the card, that the card be validated in use by production of the record. This would obviate the need for authorisation via the card issuer for transactions involving small amounts. For transactions involving larger amounts, the authorisation procedure described above would still be followed.

While the above procedure does not, at present, entirely prevent fraudulent use of an intercepted credit card for transactions involving small amounts of money, it does prevent fraudulent transactions involving larger sums which require authorisation. As more electronic point of sale (POS) devices are linked to live databases, fewer and fewer newly issued cards will be usable fraudulently, since a check on the validity of the card can be made each time the card is used. Clearly, it is possible to require that all credit card transactions be authorized, and not only those transactions involving amounts larger than a predetermined limit. Whether or not this is desirable depends largely on the extent of credit card fraud taking place at a particular time, weighed against the minor inconvenience of the authorisation procedure.

No special equipment is required to implement the method, which requires only relatively minor procedural adjustments and, possibly, revised software. For this reason, only an extremely simplified hardware block diagram is shown in FIG. 1. FIG. 1 shows a central computer/database of a financial institution linked to various terminals, including an ATM, a point-of-sale (POS) terminal, and another terminal, which could be a personal computer with a modem, an electronic till, or even a telephone. In the latter case, both the first and second identification codes (ie. the account number and PIN code) can be supplied verbally by the card holder to the financial institution via the telephone, or the diallet or keypad of the telephone can be used to input the codes. Alternatively, a tone generator supplied by financial institutions for "banking by phone" could be used with the telephone. In the latter cases, the account number is simply read off the card by the card holder.

Although systems have been proposed for increasing the security of credit transactions, such systems generally rely on relatively "high-tech" devices such as "smart cards". Such cards require special card readers, with the result that systems of this kind are relatively expensive to implement. It is a particular advantage of the present invention that it is completely compatible with conventional credit cards, and with the hardware in existing ATM's and other terminals which include magnetic stripe readers. Thus, without a large investment in new equipment, an additional measure of security (compared with presently used card authorisation methods) is achieved.

The method can accommodate systems which allow a card holder to alter his or her PIN code, and can also be applied to foreign card holders visiting a country in which the method is used.

I claim:

1. A method of validating a credit card comprising the steps of:

issuing a credit card to a holder, the credit card bearing a first identification code;

assigning a second identification code to the holder;

conducting a validation transaction utilising the credit card wherein the first and second identification codes are input to a terminal;

determining whether the first and second identification codes both correspond to the same holder;

generating a validation record confirming the validity of the card if the first and second identification codes correspond; and storing the validation record in a database which can be accessed by a vendor, so that use of the credit card may be authorised by reference to the validation record.

2. A method according to claim 1 wherein the first identification code is encoded on a magnetic stripe on the credit card.

3. A method according to claim 1 wherein the first identification code corresponds to the holder's account number.

4. A method according to claim 2 wherein in addition to the first identification code, further information such as the period of validity of the card is encoded on the magnetic stripe.

5. A method according to claim 1 wherein the second identification code is a personal identity number (PIN) assigned to the holder.

6. A method according to claim 1 wherein the transaction is conducted on an electronic terminal which reads the first identification code and any further information from the credit card, allows the holder to input the second identification code manually, and transmits the codes to a computer for comparison, the computer generating the validation record.

7. A method according to claim 6 wherein the terminal is an automatic teller machine (ATM).

8. A method according to claim 6 wherein the terminal is a point of sale (POS) terminal.

9. A method according to claim 6 wherein the terminal transmits the codes to a remote computer and associated remote database for comparison.

10. A method according to claim 6 wherein the terminal transmits the codes to an internal computer and associated internal database for comparison.

11. A method according to claim 1 wherein the terminal generates a printed record of the validation transaction.

12. A method according to claim 11 wherein the holder signs the printed record and deposits it in the terminal as proof of the validation transaction.

13. A method according to claim 11 wherein the holder retains the printed record as proof of the validation transaction.

14. A method according to claim 13 wherein the holder is required to present the printed record to authorise the use of the credit card.

15. A method according to claim 1 wherein the terminal is a telephone.

16. A method according to claim 15 wherein the codes are transmitted verbally via the telephone.

17. A method according to claim 15 wherein the codes are transmitted using a dialler or keypad of the telephone.

18. A method according to claim 15 wherein the codes are generated by a tone generator and transmitted via the telephone.

* * * * *